United States Patent [19]

McFayden

[11] 4,301,415
[45] Nov. 17, 1981

[54] PROGRAMMABLE MULTIPLE PHASE AC POWER SUPPLY

[75] Inventor: Dennis G. McFayden, San Diego, Calif.

[73] Assignee: Norlin Industries, Inc., Deerfield, Ill.

[21] Appl. No.: 117,325

[22] Filed: Jan. 28, 1980

[51] Int. Cl.³ .............................................. H03K 5/15
[52] U.S. Cl. ...................................... 328/24; 328/14; 328/55; 363/36
[58] Field of Search ...................... 328/14, 22, 24, 25, 328/55; 363/36

[56] References Cited

U.S. PATENT DOCUMENTS

| | | | |
|---|---|---|---|
| 3,500,213 | 3/1970 | Ameau | 328/14 |
| 3,657,657 | 4/1972 | Jefferson | 328/14 |
| 3,792,360 | 2/1974 | Carlow | 328/14 |
| 3,833,854 | 9/1974 | Schonover | 328/55 |
| 4,068,178 | 1/1978 | Tunzi | 328/14 |
| 4,142,245 | 2/1979 | Baron | 328/14 |

Primary Examiner—John S. Heyman
Attorney, Agent, or Firm—Jack Kail; Ronald J. Kransdorf

[57] ABSTRACT

A variable frequency oscillator for an AC power supply having programmable, multiple phase outputs comprises means including a rate multiplier for generating a clock signal having a selectively controllable frequency and one or more AC signal producing stages responsive thereto. Each AC signal producing stage includes a memory storing a quarter-cycle sinusoidal waveform segment in amplitude sampled form and an address counter responsive to the clock signal for alternately addressing the memory in forward and reverse directions for producing a continuous sequence of half-cycle sinusoidal segments, an output circuit inverting every other one of the half-cycle segments. A first one of the stages produces an output signal having a reference phase angle while the remaining stages are operated such that their associated address counters are offset from the address counter of the first stage by an amount corresponding to an input phase control code, whereby the remaining stages produce output signals having phase angles corresponding displaced from the reference phase angle.

15 Claims, 6 Drawing Figures

PROGRAMMABLE MULTIPLE PHASE AC POWER SUPPLY

BACKGROUND OF THE INVENTION

The present invention relates generally to AC power supplies and, more particularly, to an oscillator for an AC power supply capable of delivering variable frequency output signals having precisely programmable phase angles.

In a wide variety of applications, AC power, either single phase, two phase, three phase or any multiple phase, manifested in the form of a plurality of variable frequency power signals characterized by precisely controlled phase angles must be generated to enable operation of an electrical device or apparatus. For example, power supplies delivering 90° quadrature outputs as well as 120° phase shifted outputs are quite common, both types of outputs being characterized by phase angle displacements which are integer multiples of 30°. In fact, most commonly used multiple phase power signals exhibit phase angle variations or displacements which are integer multiples of 30°.

Conventionally, variable frequency power supplies utilize oscillators which are of two general types; namely, analog and digital. Analog oscillators are generally characterized by a rather simple design and provide relatively stable power signals for most applications although certain disadvantages arise when such an oscillator is incorporated in a power system. In particular, in order to maintain frequency and phase relationships to the degree of accuracy required, precision analog components frequently having matched temperature tracking characteristics must be utilized in the critical circuits of the oscillator. Also, amplitude stabilization components are normally needed to compensate for the effects of frequency and temperature changes on the amplitude of the output signals. The use of such components significantly increases the cost of analog oscillators which, nevertheless, typically still exhibit some inaccuracies due to such factors as component and temperature variations.

Digital oscillators, on the other hand, utilize crystal references to maintain output signal accuracy. Since the phase accuracy is digitally controlled, it is not sensitive to frequency, amplitude or temperature variations and the output frequency response is only a function of any filtering in the signal conditioning circuits. Unfortunately, the filtering circuits are normally quite complex and do impose various limitations on system operation. In one known form of digital oscillator, a binary counter is used to control the output frequency by dividing a reference frequency by a selected dividing ratio, the divided frequency signal being then used to clock an address counter for addressing a suitably programmed memory at a corresponding rate. However, since the clock signal is derived by dividing the reference frequency, it is not always exact so that, in order to achieve high accuracy at all frequencies, the reference frequency must be uncommonly high. It is also known to construct a digital oscillator using an accumulator to address a memory device, see, for example, U.S. Pat. No. 3,735,269. In accordance with this technique, the number of addressing steps used to generate a waveform is changed in order to vary the frequency which results in a highly distorted waveform at high frequencies necessitating the use of a rather complex filter. Also, phase angle programming is not readily achievable using this approach.

Another known type of digital oscillator employs a phase locked loop to generate the frequency for clocking the memory controlling address counter. This approach has the disadvantage of requiring a certain finite lock time and requires an excessive number of components to implement the phase locked loop. Also, as in the case of other digital oscillators embodying memory devices, the required memory capacity, especially when such must be duplicated for multiple phase outputs, often imposes severe limitations on system design.

SUMMARY OF THE INVENTION

It is accordingly a basic object of the invention to provide a novel AC power supply for providing one or more variable frequency output signals having precisely programmable phase angles.

It is a more specific object of the invention to provide an AC power supply of the foregoing type which utilizes digital techniques for achieving improved and highly stable output accuracy, both of frequency and phase angle displacement.

Yet another object of the invention is to provide an AC power supply embodying one or more memory devices which are programmed using a minimum of memory capacity and which are selectively controllable for providing output signals characterized by phase angles which are precise integer multiples of 30°.

In accordance with these and other useful objects, an AC power supply constructed according to the invention comprises an oscillator for producing a stable frequency reference signal, a rate multiplier controllably operable for selectively reducing the frequency of the reference signal for producing a clock signal and one or more substantially identical AC signal producing stages responsive to the clock signal. Each of the stages includes a memory storing a binary representation of a quartercycle sinusoidal waveform segment and an address counter responsive to the clock signal for developing numerically increasing or decreasing address signals for sequentially addressing the memory in a forward or a reverse direction respectively. A control circuit includes means for decoding the address signals for operating the address counter to alternately address the memory in a forward direction and in a reverse direction thereby causing the memory to output a continuous sequence of half-cycle sinusoidal segments. An output circuit inverts every other one of the half-cycle segments so that a periodic sinusoidal output signal is produced. A first one of the stages is designated as a reference phase stage and produces an AC output signal having a reference phase angle preferably of 0°. The remaining stages each comprises a slave phase stage including means for presetting the associated address counter according to a selected phase control code in response a synchronizing signal developed by the reference stage. As a result, the address signals developed by the slave stage are offset from the address signals developed by the reference stage by an amount corresponding to the phase control code causing the AC signal developed by the slave stage to be characterized by a phase angle correspondingly displaced from the reference phase angle. In a preferred embodiment of the invention, the address counters and memories are configured for enabling phase angle differences to be produced at exact integer multiples of 30°.

DESCRIPTION OF THE PREFERRED EMBODIMENT

Figure 1:
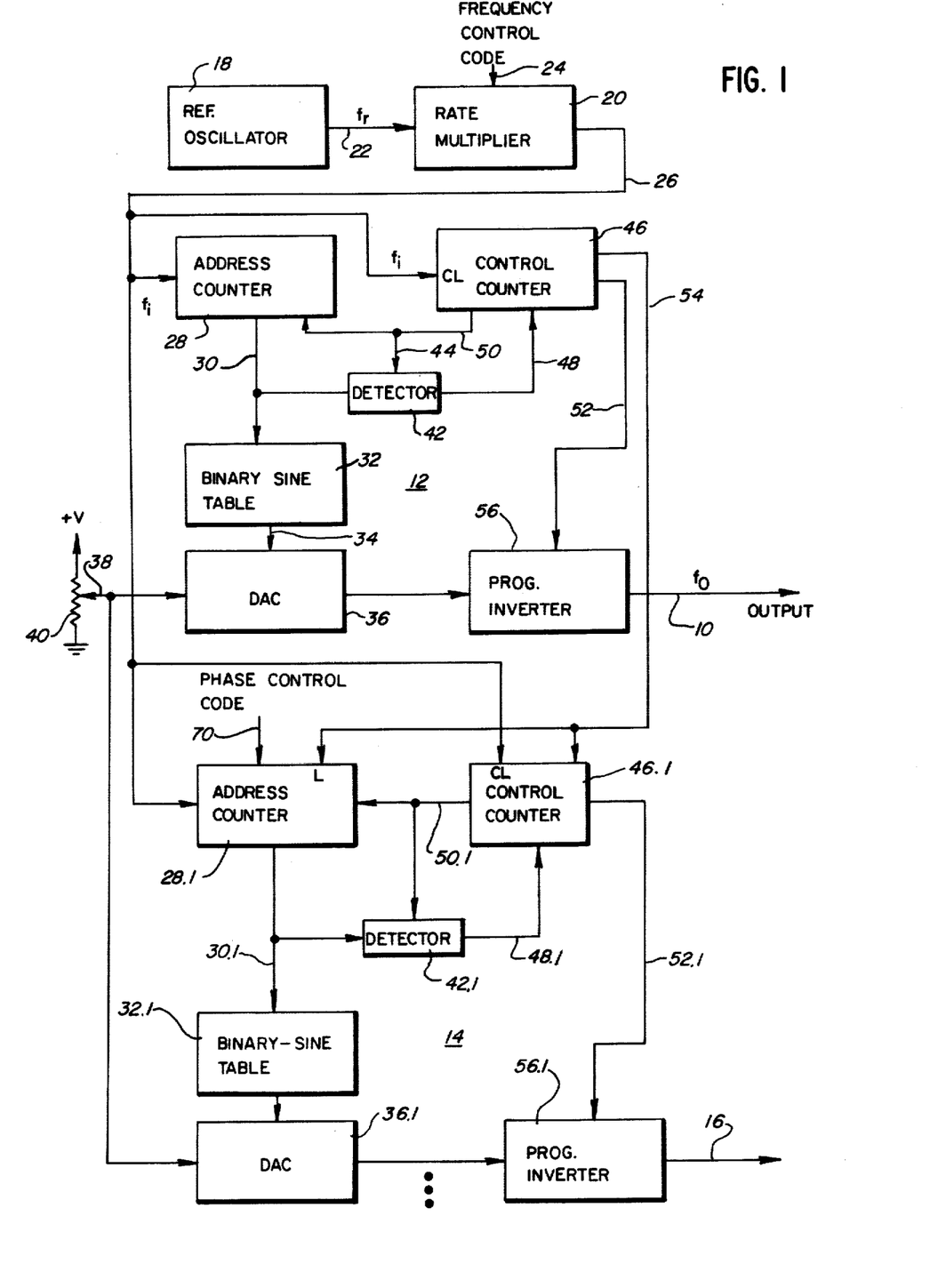
FIG. 1 is a block diagram illustrating a preferred embodiment of a variable frequency multiple phase AC power supply constructed according to the present invention.

Referring to the drawings, there is illustrated in FIG. 1 a preferred embodiment of a digitally controllable AC power source for providing a plurality of AC output voltage signals, each having the same adjustable frequency and a different controllable phase angle. A first voltage output signal having a frequency $f_0$ and characterized by a predetermined reference phase angle is developed at the output 10 of a reference phase stage 12 of the system. Additional output voltage signals also having the frequency $f_0$ but characterized by different phase angles are developed at the outputs of a plurality of slave phase stages operated in synchronism with the reference phase stage 12. One such slave phase stage is illustrated at 14 and includes an output 16 developing an output voltage signal characterized by a frequency $f_0$ and a phase angle displaced by a precisely controllable amount from the reference phase angle.

The AC power source includes a reference oscillator 18 coupling a precisely controlled square wave signal whose repetition rate is $f_r$ to a rate multiplier 20 over a line 22. The rate multiplier 20, in turn, controllably reduces the repetition rate of the reference oscillator output $f_r$ in accordance with a frequency control code supplied by an input control bus 24 and couples the reduced repetition rate reference oscillator signal to an output line 26. The repetition rate of the signal developed on output line 26 is represented by the symbol $f_i$, the value of which may be derived by multiplying the repetition rate $f_r$ by the multiplication factor M characterizing the rate multiplier 20. The multiplication factor M has a value, always less than unity, determined in accordance with the frequency control code supplied on bus 24.

Signal $f_i$ developed on the output line 26 of the rate multiplier 20 is coupled to the clock inputs of a modulo N address counter 28 and to a control counter 46 of the reference phase stage 12. The output of the address counter 28 is coupled by an address bus 30 to the input of a binary to sine look up table 32 which may be embodied in a suitable memory device such as a ROM or a PROM. The binary to sine look up table 32 includes a number of uniquely addressable memory locations equal in number to the counting states of the address counter 28. For example, in the case where the address counter 28 is a modulo 8 counter, the binary to sine look up table 32 would comprise 256 8-bit memory locations. The memory device 32 is programmed such that when its memory locations are sequentially addressed in a forward direction, i.e. from the lowest memory address to the highest memory address, a positively sloped quarter cycle sinusoidal segment signal is developed on an output line 34. This signal therefore corresponds to the segment of a sine wave between 0° and 90° in binary form. On the other hand, when the memory device 32 is sequentially addressed in a reverse direction, i.e. from the highest memory address to the lowest memory address, a negatively sloped quarter cycle sinusoidal segment signal is developed on the output line 34. This signal therefore corresponds to the segment of a sine wave between 90° and 180° in binary form. As a result, either a 0°–90° or a 90°–180° sinusoidal quarter-cycle segment may be produced on the output line 34 of the binary to sine look up table 32 in response to sequentially operating the address counter 28 in an up-count or a down-count mode respectively. Moreover, a continuous half-cycle sinusoidal segment defining a sine wave segment between 0° and 180° may be produced on the output line 34 by combining a 0°–90° quarter cycle sinusoidal segment with a 90°–180° quarter cycle sinusoidal segment.

The quarter cycle sinusoidal segment signals developed on the output 34 of the binary to sine look up table 32 are coupled to one input of a digital to analog converter 36, the other input to the converter being derived from the slider 38 of a potentiometer resistor 40 connected between a source of positive potential and ground. The digital to analog converter 36 forms an analog representation of the binary quarter-cycle sinusoidal segment signals developed on line 34, the amplitude of the analog representations being determined by the DC voltage coupled to the converter by the potentiometer slider 38.

The address bus 30 of the address counter 28 is also coupled to the input of a detector circuit 42. Assuming again that the address counter 28 is a modulo 8 counter, the detector circuit 42 is configured for detecting state 254, the second highest state of the counter, or state 001, the second lowest state of the counter, achieved on the address bus 30 depending upon the state of a logic signal coupled to the control input 44 of the detector. In particular, the detector circuit 42 is operable for detecting state 254 of the address counter 28 in response to the presentation of a logical 1 signal to the control input 44 and for detecting state 001 of the address counter 28 in response to the presentation of a logical 0 state signal to the control input 44.

Figure 2:
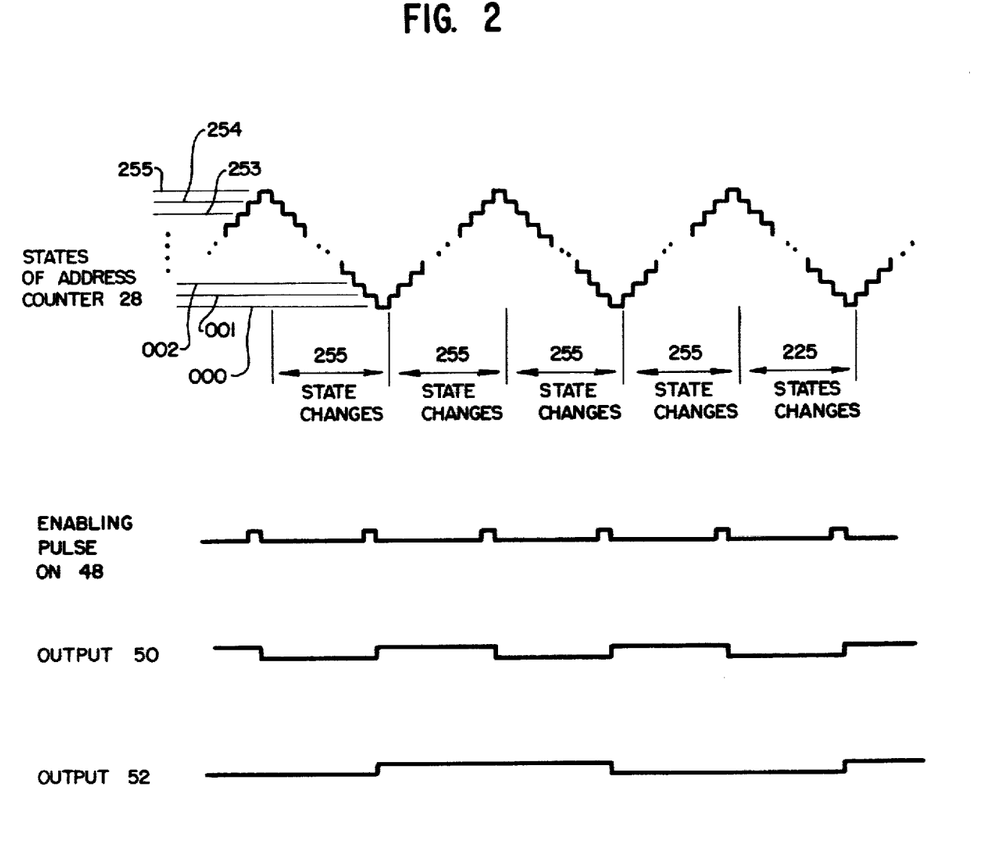
FIGS. 2 and 3 graphically illustrates various waveform diagrams pertinent to the operation of the power supply of FIG. 1.

In response to each detected state of the address counter 28, a control pulse is coupled by the detector circuit 42 to the enable input of the control counter 46 over a line 48. The control counter 46 includes three outputs 50, 52 and 54. Output 50, which supplies the control input of the detector circuit 42, also determines the mode of operation of the address counter 28. More specifically, the signal developed on the output 50 alternately switches between a logical 0 and a logical 1 state one period of signal $f_i$ after the occurrence of an enabling pulse on the line 48 whereby the address counter 28 is alternately enabled for operation in an up-count and a down-count mode. Thus, in response to the detector circuit 42 detecting state 254 of the address counter 28 when operating in its up-counting mode, the signal on output 50 goes from logical 1 to logical 0 in time coincidence with state 255 of the counter. The address counter is thereby placed in its down-count mode of operation whereby, in response to the next $f_i$ pulse, the counter decrements to state 254. Upon reaching state 001, another enabling pulse is developed by the detector circuit 42 causing the signal on output 50 to go from logical 0 to logical 1 in time coincidence with state 000 of the counter. The address counter is thereby placed in its up-count mode of operation whereby, in response to the next $f_i$ pulse, the counter increments to state 001. The foregoing process, which is continuously repeated, is illustrated in FIG. 2. It will be observed that an enabling pulse is developed on line 48 of the detector circuit during state 254 and 001 of the address counter 28. Also, output 50 of the control counter 46 transitions from a logical 1 to a logical 0 state in time coincidence with the address counter achieving state 255 and from a logical 0 to a logical 1 state in time coincidence with the address counter achieving state 000. The significance of the foregoing, which will be explained in more detail hereinafter, is that each counting cycle of the address counter is characterized by 255 state changes even though a 256 state or modulo 8 counter is employed.

The signal developed on output 52 of the control counter 46 is coupled to the control input of a programmable inverter circuit 56, the data input of the programmable inverter 56 being derived from the output of the digital to analog converter 36. The programmable inverter 56 is operable for inverting the data presented from the digital to analog converter 36 in response to the presentation of a logical 1 signal to its control input and for passing the data in an uninverted form in response to the presentation of a logical 0 signal to the control input. The signal developed on the output 52 of the control counter 46 forms a divided by two representation of the signal developed on the output 50 of the counter. Therefore, logical 0 and logical 1 level signals are alternately developed on the output 52 during successive up and down counting cycles of the address counter 28.

Figure 3:
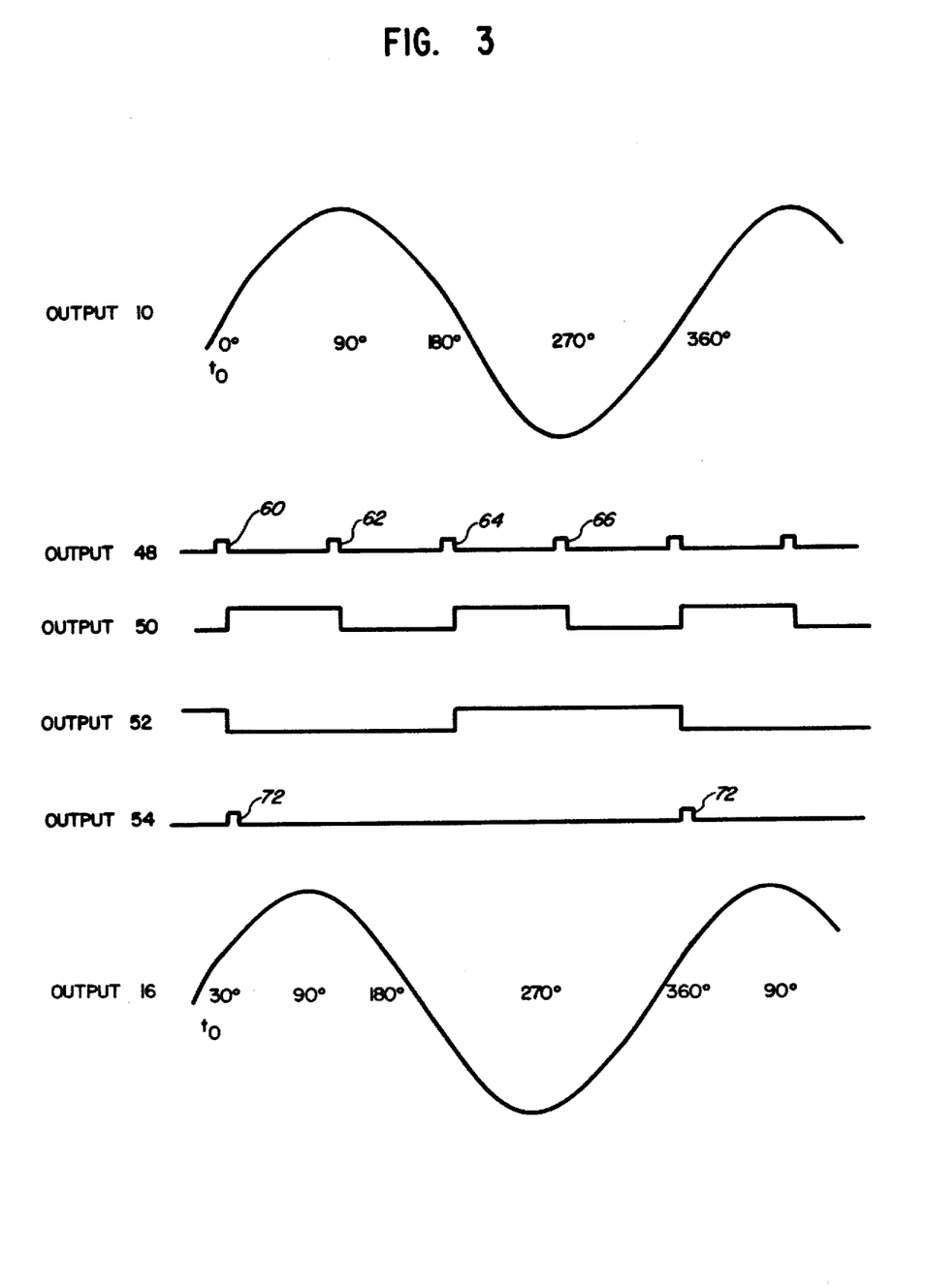

The operation of the reference phase stage 12 of the system illustrated in FIG. 1 will be more readily understood with reference to the waveforms shown in FIG. 3. In general terms, it will be recalled that the address counter 28 is alternately enabled for counting up and down through its complete counting cycle by accomplishing 255 state changes. Consequently, the memory 32 is addressed for developing on the output line 34 a continuous series of rectified half-wave sinusoidal segments in binary form. These rectified binary half-wave sinusoidal segments are converted to an analog form at the output of converter 36 and applied to the data input of the programmable inverter 56. The inverter is operated for inverting every other one of the analog half-wave segments whereby an analog sinusoidal signal is developed on the output 10 of the reference phase stage 12. The frequency $f_0$ of this signal is determined by the frequency control code developed on bus 24.

With more particular reference to FIG. 3, assume initially that the modulo 8 address counter 28 is completing a down-count cycle. Upon the address bus 30 of the counter 28 achieving a state of 001, an initial enabling pulse 60 is developed on the output 48 of the detector circuit 42. The enabling pulse 60 allows the output 50 of the control counter 46 to go logically high during the next clock pulse $f_i$ placing the address counter 28 in its up-count mode of operation and conditioning the detector circuit 42 for detecting state 254 of the address counter 28. Also, the output 52 of the control counter goes logically low whereby the programmable inverter 56 is placed in its non-inverting mode of operation. The address counter 28, which has been placed in its up-count mode of operation, begins counting in a forward direction, see FIG. 2, at a rate determined by signal $f_i$ for sequentially addressing the binary to sine look up table 32. The binary to sine look up table 32 consequently coupled a quarter cycle sinusoidal segment in binary form to the input of the digital to analog converter 36. The converter 36 converts the binary output of the binary to sine look up table 32 to an analog signal whose amplitude is controlled by the setting of the potentiometer slider 38. This analog signal is then coupled in non-inverted form by the programmable inverter 56 to the output line 10 of the reference phase stage 23 in the form of a quarter cycle sinusoidal signal extending between 0° and 90°.

Upon the address bus 30 of the address counter 28 achieving state 254 a second enabling pulse 62 is developed on the output 48 of the detector circuit 42. The signal on the output 50 of the control counter 46 thereby goes logically low in time coincidence with the next occurring pulse $f_i$ placing the address counter 28 in its down-count mode of operation and conditioning the detector circuit 42 for detecting the next occurring 001 state of the counter 28. The signal on the output 52 of the control counter 46 remains logically low. The address counter 28, which has been placed in its down-count mode of operation, begins counting down from state 255 for sequentially addressing the binary to sine look up table 32 in a reverse direction. As a consequence, the binary to sine look up table 32 couples a binary signal to line 34 representing a quarter cycle sinusoidal segment extending from 90° to 180°. This signal is converted to an analog form by the converter 36 and coupled through the programmable inverter 56 in non-inverted form to the output line 10. Therefore, to this point, a positive half-cycle sinusoidal segment has been developed on the output line 10 of the reference phase stage 12 of the circuit of FIG. 1.

In response to the next 255 state changes of the address counter 28, the detector circuit 42 develops a third enabling pulse 64 on the output 48 in response to the address bus 30 of the address counter 28 achieving a state of 001. The output 50 of the control counter 46 consequently again goes logically high reestablishing the up-count mode of operation of the address counter 28 and again conditioning the detector circuit 42 for detecting the next occurring 254 state of the counter 28. Also, the output 52 of the control counter 46 now goes logically high placing the programmable inverter 56 in its inverting mode of operation. The address counter 28 again begins sequentially addressing the binary to sine look up table 32 in a forward direction whereby a binary signal representing a quarter-cycle sinusoidal segment between 0° and 90° is developed on line 34 and coupled to the digital to analog converter 36. The analog representation of this signal is inverted by the programmable inverter 56 and developed on the output 10 as a negative going quarter-cycle sinusoidal segment extending between 180° and 270°. In response to the address bus 30 again achieving the state 254, an enabling pulse 66 is developed on the output 48 of the detector circuit 42. As a result, the address counter 28 is switched to its down-count mode of operation while the detector circuit is again conditioned for detecting the next occurring 001 state of the counter 28. The output 52 of the control counter 46 remains logically high so that the programmable inverter 56 continues to invert signals provided by the digital to analog converter 36. The address counter 28 consequently sequentially addresses the binary to sine look up table 42 in a reverse direction forming on the output 34 a binary quarter-cycle sinusoidal segment corresponding to the segment formed between 90° and 180°. This binary signal is converted to analog form by the converter 36 and inverted by the programmable inverter 56 whereupon a quarter-cycle sinusoidal segment extending between 270° and 360° is developed on the output 10 of the reference phase stage 12.

It will therefore be seen that the reference phase stage 12 has produced at the output 10 a complete cycle of a sinusoidal signal having a reference phase angle of 0°. The circuit continues to operate in the manner described so that a continuous wave sinusoidal signal is produced. In this regard, it will be observed that the first quarter-cycle of each period of the output signal is formed by operating the address counter 28 in its up-count mode and the programmable inverter 56 in its non-inverting mode of operation. Each second quarter-cycle segment extending between 90° and 180° is formed by operating the address counter in its down-count mode of operation and the programmable inverter 56 in its non-inverting mode. For each quarter-cycle segment extending between 180° and 270° the address counter 28 is operated in its up-count mode and the programmable inverter 46 is operated in its inverting mode while the segments extending between 270° and 360° the address counter is operated in its down-count mode and the programmable inverter is operated in its inverting mode.

The frequency of the signal developed on the output 10 of the reference phase stage 12 is determined by the frequency control code supplied to the rate multiplier 20 over the bus 24. In particular, the frequency $f_0$ of the signal developed on the output 10 is given by the expression $f_0 = f_r (M/4N)$, where M represents the multiplication factor of rate multiplier 20 as determined by the frequency control code and N corresponds to the number of states of the address counter 28. Accordingly, control of the frequency characterizing the signal developed on the line 10 is conveniently facilitated by varying the multiplication factor M characterizing the rate multiplier 20 through control of the frequency control code. Particularly desirable results are achieved when using a modulo 8 address counter. In this case, and as previously described, 255 state changes of the address counter are repeated during every 90° of the output signal so that a total of 1020 state changes or steps are needed to complete one entire cycle of the signal developed on output line 10. Since each state change of the address counter therefore corresponds to 90/255 degrees, exactly 85 state changes produce a 30° change in the output sinusoidal signal. As will be explained in greater detail hereinafter, this precise relationship allows the phase angle characterizing the slave phase stages, e.g. stage 14, to be precisely programmed for exhibiting, among others, phase angle variations which are exact multiples of 30°.

The slave phase stage 14, which is exemplary of any of a number of additional slave phase stages which may be used in association with the reference phase stage 12, is configured substantially identically to the reference phase stage 12 as described above. Thus, the slave phase stage 14 includes an address counter 28.1, preferably a modulo 8 counter, clocked by the signal $f_i$ developed on line 26 and having an output connected to a binary to sine look up table memory 32.1 by an address bus 30.1, the memory table 32.1 being programmed identically as the memory table 32 of the reference phase stage 12.

The address bus 30.1 is also connected to one input of a detector circuit 42.1 which operates for developing enabling pulses on an output line 48.1 in a manner equivalent to the control pulses developed on the line 48. The enabling pulses developed on the line 48.1 are coupled to one input of a control counter 46.1 which also receives a synchronizing signal from line 54 and a clock signal from line 26 of the reference stage 12. A first output of the control counter 46.1 is developed on a line 50.1 which controls the mode of operation of the address counter 28.1 and the conditioning of the detector circuit 42.1 as described above with respect to the reference stage 12. A second output of the control counter 46.1 is developed on a line 52.1 which controls a programmable inverter 56.1. The programmable inverter 56.1 receives a data input from a digital to analog converter 36.1 which is connected for converting the binary output of the memory table 32.1 to a corresponding analog signal having an amplitude determined by the position or setting of the potentiometer slider 38. Finally, referring back to the address counter 28.1, it will be seen that the synchronizing signal developed on line 54 of the reference stage 12 and applied to the control counter 46.1 is also applied to the load input of the address counter 28.1 while a phase control code is coupled to the preset inputs of the counter over a bus 70. Thus, with the exception of the synchronizing signal on line 54 and the phase control code on bus 70, the slave phase stage 14 is configured identically to the reference phase stage 12.

The purpose of the slave phase stage 14 is to develop an output signal on line 16 having a frequency equal to the frequency $f_o$ of the signal developed on the output 10 of the reference phase stage 12 but at a phase angle controllably displaced therefrom. The phase control code developed on bus 70 provides the vehicle by which the amount of deviation between the phase angles characterizing the two signals developed on the output lines 10 and 16 can be precisely controlled. Thus, assuming that the signal developed on output 10 has a reference phase angle of 0°, the signal developed on output line 16 can be structured for exhibiting phase angles variously displaced from 0° by appropriately selecting the value of the phase control code coupled to bus 70. Phase angles displaced from 0° by multiples of 30° are, in particular, most advantageously and precisely accommodated.

More particularly, referring again to FIGS. 1 and 3, output 54 of the control counter 46 of the reference stage 12 develops a synchronizing pulse 72 coinciding with each 0° phase angle of the output signal developed on output 10 of the reference stage. Therefore, one such synchronizing pulse is produced during each period of the programmable inverter control signal produced on the output 52 of the control counter 46. The synchronizing pulses 72 are coupled to the load input of the address counter 28.1 and the preset input of the control counter 46.1 of the slave phase stage 14. The address counter 28.1 is responsive to the synchronizing pulses 72 for assuming a preset state corresponding to the phase control code developed on bus 70 while the control counter 46.1 appropriately sets the logic level of the signals on output lines 50.1 and 52.1. As a result, the address signals developed on the address bus 30.1 are offset relative to the address signals developed on the address bus 30 by an amount corresponding to the phase control code supplied on bus 70. Therefore, by suitably setting the counter mode control signal developed on output line 50.1 and the programmable inverter control signal developed on output line 52.1, a sinusoidal output is produced on line 16 whose frequency is $f_0$ and which is characterized by a phase angle offset from 0° by an amount determined by the phase control code.

By way of example, assume that it is desired to produce an output on line 16 having a phase angle offset from the reference phase angle (0°) by 30°. Also, it is assumed that both counters 28 and 28.1 are modulo 8 counters. As previously discussed, in order to address the memory location of the binary to sine look up table 32.1 storing the amplitude sample corresponding to 30°, the address counter 28.1 must be set to state 01010010 (i.e. decimal 85). Therefore, the phase control code supplied on bus 70 is adjusted to this value.

In operation, the reference phase stage 12 is effective for generating on output 10 a sinusoidal signal having a frequency $f_0$ and a phase angle of 0° exactly as discussed above. At each 0° angle of this signal a synchronizing pulse 72 is developed on output 54 and applied to address counter 28.1 and control counter 46.1. The address counter 28.1 is consequently preset to the value of the phase control code, i.e. 01010010, whereby the memory location of memory 32.1 storing the amplitude sample corresponding to 30° is addressed. At the same time the control counter 46.1 is set such that the signal on output 50.1 is logical 1 placing the counter 28.1 in its up-count mode of operation and conditioning the detector circuit 42.1 for detecting state 254 of the address counter while the signal on output 52.1 is set to logical 0 placing the programmable inverter 56.1 in its non-inverting mode of operation. It will be observed that the slave phase stage 14 has thereby been placed or set in the same mode of operation as the reference phase stage 12 except that the address signals supplied to the memory 32.1 have been offset from the address signals being supplied to the memory 32 by an amount resulting in a 30° offset in the outputs of the memories. Consequently, referring to FIG. 3, at time $t_0$ when the output on line 10 has a value of zero, the output on line 16 will have a positive value corresponding to the sine of 30°.

Subsequently of time $t_0$ the slave phase stage 14 operates in a manner identical to the operation of the reference phase stage 12. Thus, the address counter 28.1 sequentially addresses the memory 32.1 in a forward direction whereby a binary representation of a sinusoidal signal extending between 30° and 90° is coupled to and converted by converter 36.1 to a corresponding analog signal. The analog signal is passed in non-inverted form through programmable inverter 56.1 and developed on output line 16. Upon address counter 28.1 achieving state 254, which occurs prior to address counter 28 achieving the same state by a time interval corresponding to $85(1/f_0)$, an enabling pulse is developed at the output of detector circuit 42.1 causing, on period of signal $f_0$ later, the output 50.1 to go logically low, placing counter 28.1 in its down-count mode of operation, the output 52.1 remaining logically high. The counter 28.1 is therefore clocked by signal $f_0$ through a complete counting cycle whereby the memory is sequentially addressed in a reverse direction such that a sinusoidal segment between 90° and 180° is coupled through the programmable inverter 56.1 to the output 16 in non-inverted form. At count 001 of the address counter 28.1, which also occurs prior to address counter 28 achieving the same state by a time interval corresponding to $85(1/f_0)$, another enabling pulse is developed at the output of detector circuit 42.1 causing, one period of signal $f_i$ later, output 50.1 to go logically high, placing counter 28.1 in its up-count mode of operation, and output 52.1 to also go logically high placing the programmable inverter 56.1 in its inverting mode of operation. The memory 32.1 is accordingly sequentially addressed in a forward direction for producing a positive going sinusoidal signal which is inverted by the programmable inverter 56.1 for developing on output 16 the sinusoidal segment extending between 180° and 270°. At this time, another enabling pulse is produced by the detector circuit 42.1 for enabling production of the segment between 270° and 360°.

The next control pulse developed by the detector circuit 42.1 enables the production of the next segment extending from 360° or 0° to 90°. During the production of this segment, specifically, at the 30° angle, a synchronizing pulse is developed at the output 54 of the control counter 46. This synchronizing pulse attempts to preset the address counter 28.1 to the phase control code but, since the counter is already in this state, the synchronizing pulse has no effect on the operation of the circuit. It is, however, nevertheless, considered desireable to continue applying the synchronizing pulses to the slave phase stage 14 as a redundancy check on system operation.

From the foregoing, it will be appreciated that the signal developed on output 16 of slave phase stage 14 comprises a sinusoidal signal having a frequency $f_0$ and a phase angle of 30° relative to the signal developed on the output 10 of the reference phase stage 12. Additional similarly structured slave phase stages may be included to provide further outputs whose phase angles are selectably offset from the reference angle of 0° by amounts determined by the particular phase control code coupled to each of such additional slave stages.

Figures 4, 5, 6:
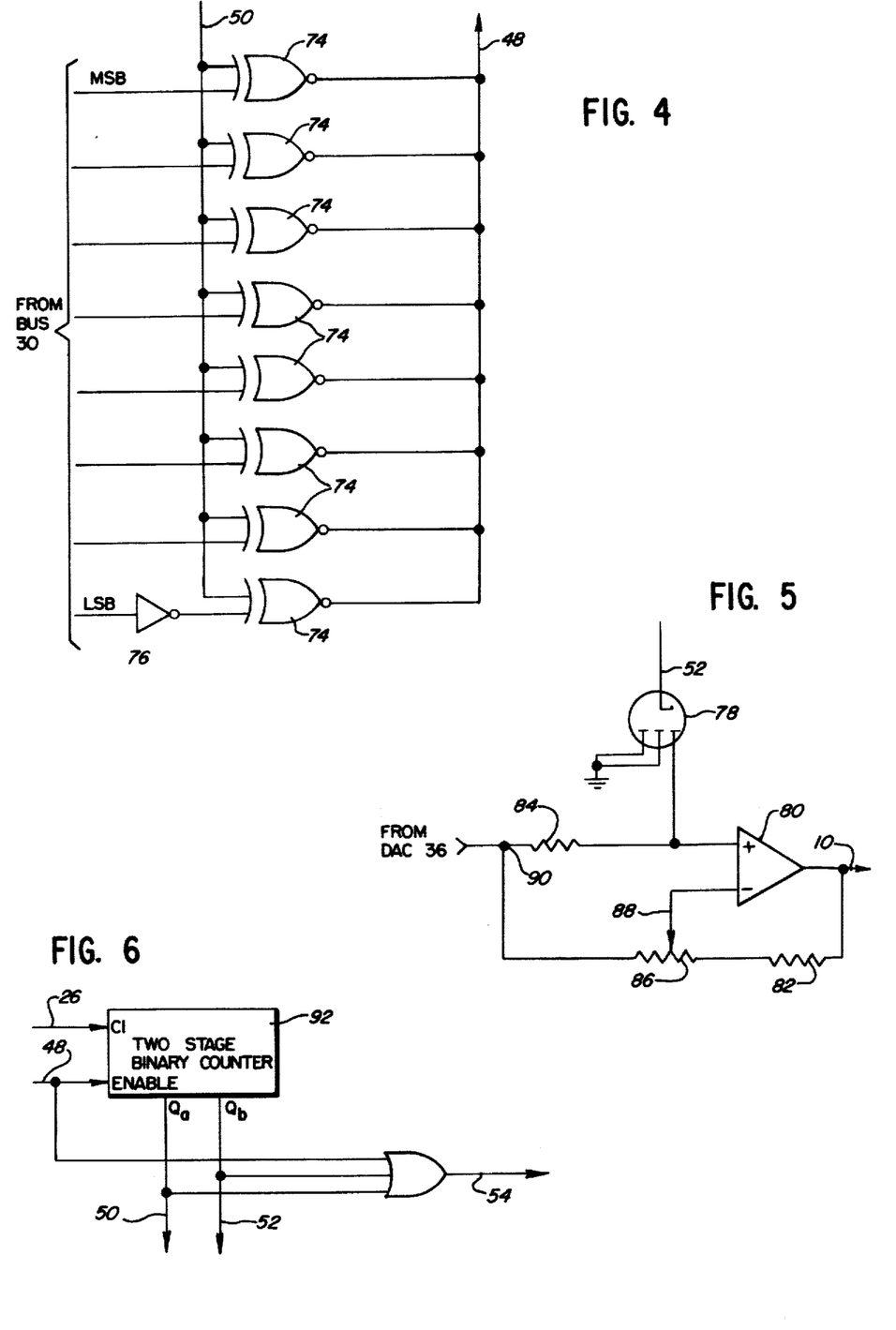
FIG. 4 is a logic diagram showing an embodiment of the detector circuit of FIG. 1.
FIG. 5 is a schematic diagram showing an embodiment of the programmable inverter of the circuit of FIG. 1.
FIG. 6 is a logic diagram showing an embodiment of the control counter of FIG. 1.

FIG. 4 illustrates a preferred embodiment of detector circuit 42. The circuit includes eight open collector EXCLUSIVE NOR gates 74 each having one input connected to the output 50 of the control counter 46. The least significant bit of the address signals developed on address bus 30 is coupled through an inverter 76 to the second input of the last of the NOR gates 74 while the remaining NOR gates 74 each receive at its second input another one of the bits of the address signals in consecutive order. The outputs of the NOR gates 74 are connected in common for forming the output 48 of the detector circuit 42. The illustrated circuit is operable for generating a logical 1 output on line 48 only when the second input of each of the gates 74 is presented with a logic level equal to the logic level presented to the first input of the respective gate. When the state of line 50 is logical 1, the foregoing condition is only satisfied for the 8-bit address signal 11111110 which corresponds to state 254 of the address counter 28. On the other hand, when the state of line 50 is logical 0, the condition is satisfied only for the 8-bit address signal 00000001.

FIG. 5 illustrates a preferred embodiment of the programmable inverter circuit 56. The output 52 of the control counter 46 is connected to the gate terminal of an FET 78, the source and substrate terminals of the FET 78 being connected to a point of ground potential. The drain terminal of the FET 78 is connected to the non-inverting input of an operational amplifier 80 whose output forms the output 10 of the reference phase stage 12. A feedback network including a pair of resistors 82 and 84 and a potentiometer 86 couples the output of the operational amplifier 80 back to its non-inverting input. The inverting input of the operational amplifier 80 is coupled to the slider 88 of the potentiometer 86 while data signals from the DAC 36 are coupled to the junction 90 formed between the resistor 84 and the potentiometer 86. In operation, the FET 78 is rendered conductive in response to the application of a logical 1 level signal to its gate terminal by line 52. As a result, the operational amplifier 80 is operated for inverting signals coupled to junction 90. On the other hand, when a logical 0 level signal is coupled from line 52 to the gate terminal of FET 78, the FET is rendered non-conductive whereby the operational amplifier 80 is operated as a buffer and signals are passed from junction 90 to output 10 in a non-inverted form.

FIG. 6 illustrates a preferred embodiment of the control counter 46. The output 26 of the rate multiplier 20 is coupled to the clock input of a two stage binary counter 92 which also receives an enabling signal from the output 48 of the detector circuit 42. The output Qa of the first stage of the counter 92 forms the up-down count mode control signal on the output 52 of the control counter while the output Qb of the second stage of the counter 92 forms the control signal coupled by the output 52 of the control counter to the programmable inverter 56. The Qa and Qb outputs of the counter 92 are also OR'd together with the enabling signal developed on line 48 to form the slave stage synchronizing signal developed on the output 54 of the control counter.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

What is claimed is:

1. An oscillator for an AC power supply comprising:
   means for generating a clock signal having a selectively controllable pulse repetition rate;
   a memory storing a binary representation of a quarter-cycle sinusoidal waveform segment at a plurality of sequential memory locations;
   an address counter responsive to said clock signal and operable for developing output address signals for sequentially addressing the memory locations of said memory in a forward direction and in a reverse direction;
   control means responsive to said address signals for operating said address counter for alternately addressing the entire contents of said memory in a forward direction and in a reverse direction for causing said memory to output a continuous sequence of half-cycle sinusoidal waveform segments; and
   output means responsive to said control means for inverting every other one of the half-cycle sinusoidal waveform segments developed by said memory, whereby a periodic sinusoidal output signal is produced.

2. A power supply as claimed in claim 1 wherein said means for generating a clock signal comprises oscillator means for producing a stable frequency reference signal and a rate multiplier controllably operable for selectively reducing the frequency of said reference signal for generating said clock signal.

3. A power supply as claimed in claim 1 wherein:
   said address counter comprises a modulo 8 binary counter;
   said memory is configured for storing said quarter-cycle sinusoidal waveform segment at 256 sequential memory locations; and
   said control means comprises means for operating said address counter for alternately addressing said 256 memory locations in a forward direction and in a reverse direction during successive time intervals corresponding to 255 periods of said clock signal.

4. A power supply as claimed in claim 1 including means connected between said memory and said output means for converting the binary output of said memory to a corresponding analog signal.

5. A power supply as claimed in claim 3 wherein said control means comprises detector means for developing a control signal identify states 001 and 254 of said address counter and counting means responsive to said control signal for causing said address counter to reverse its counting direction one period of said clock signal thereafter.

6. A power supply as claimed in claim 3 wherein said memory, said address counter, said control means and said output means collectively comprise a reference phase stage for producing said output signal which is characterized by a reference phase angle and including at least one slave phase stage identical to said reference phase stage and having means responsive to said reference stage for causing the address signals developed by the address counter of said slave stage to be continuously offset from the address signals developed by the address counter of said reference stage, whereby the output means of said slave stage produces a sinusoidal output signal having a phase angle differing from said reference phase angle by an amount corresponding to said offset.

7. A power supply as claimed in claim 6 wherein said control means of said reference stage comprises means for developing a sync signal coinciding with a predetermined phase angle of the output sinusoidal signal produced thereby and including means coupling a selected phase control code to the preset inputs of the address counter of said slave stage, said sync signal being coupled to the load input of the address counter of said slave stage for presetting the address counter according to said selected phase control code.

8. A power source oscillator for generating a plurality of AC signals each having the same frequency and a different phase angle comprising:
   means for generating a clock signal having a selectively controllable frequency;
   a first AC signal producing stage including a binary memory sequentially storing a quarter-cycle sinusoidal waveform segment in amplitude sampled form, means responsive to said clock signal for developing output address signals for alternately addressing said binary memory in a forward direction and in a reverse direction for causing said memory to output a continuous sequence of half-cycle sinusoidal waveform segments and output means responsive to said means for addressing for inverting every other one of said half-cycle sinusoidal segments for producing a periodic output sinusoidal signal having a reference phase angle, and
   a second one of said AC signal producing stages including means responsive to said first stage for selectively offsetting the address signals of said first stage relative to the address signals of said second stage for causing the AC signal developed by the output means of said second stage to be characterized by a phase angle differing from said reference phase angle by an amount corresponding to said offset.

9. An oscillator as claimed in claim 8 wherein said means for generating a clock signal comprises oscillator means for producing a stable frequency reference signal and a rate multiplier controllably operable for selectively reducing the frequency of said reference signal for generating said clock signal.

10. An oscillator as claimed in claim 9 wherein each of said first and second stages includes means connected between said memory and said output means for converting the binary output of said memory to a corresponding analog signal.

11. An oscillator as claimed in claim 8 wherein said means for addressing of said first and second stages each comprises:
   an address counter responsive to said clock signal and operable for developing output address signals for sequentially addressing said memory in a forward direction and in a reverse direction; and
   control means responsive to said address signals for operating said address counter for alternately addressing the contents of said memory in a forward direction and in a reverse direction for causing said memory to output a continuous sequence of half-cycle sinusoidal waveform segments.

12. An oscillator as claimed in claim 11 wherein:
   the address counters of said first and second stages each comprises a modulo 8 binary counter;
   the memories of each of said first and second stages is configured for storing said quarter-cycle sinusoidal waveform segment at 256 sequential memory locations; and
   the control means of each of said first and second stages comprises means for operating its associated address counter for alternately addressing said 256 memory locations in a forward direction and in a reverse direction during successive time intervals corresponding to 255 periods of said clock signal.

13. An oscillator as claimed in claim 12 wherein each of said control means of said first and second stages comprises detector means for developing a control signal for identifying states 001 and 254 of its associated address counter and counting means responsive to said control signal for causing the address counter to reverse its counting direction one period of said clock signal thereafter.

14. An oscillator as claimed in claim 13 wherein said control means of said first stage comprises means for developing a sync signal coinciding with a predetermined phase angle of the output sinusoidal signal produced thereby and including means coupling a selected phase control code to the preset inputs of the address counter of said second stage, said sync signal being coupled to the load input of the address counter of said second stage for presetting the addressing counter according to said selected phase control code.

15. An oscillator as claimed in claim 14 including means for generating said phase control code in the form of an 8-bit binary number comprising a selected integer multiple of 85, whereby the AC signal produced by said second stage is characterized by a phase angle differing from said reference phase angle by a corresponding integer multiple of 30°.

* * * * *